United States Patent
Golub et al.

(10) Patent No.: US 6,783,816 B2
(45) Date of Patent: Aug. 31, 2004

(54) METALLIZED INKJET SUBSTRATES AND METHODS OF MAKING THE SAME

(75) Inventors: Valery Golub, Highland, IN (US); Dean Hanawalt, St. John, IN (US); Steve Saunders, Aurora, OH (US)

(73) Assignee: Avery Dennison Corporation, Pasadena, CA (US)

( * ) Notice: Subject to any disclaimer, the term of this patent is extended or adjusted under 35 U.S.C. 154(b) by 67 days.

(21) Appl. No.: 10/121,784

(22) Filed: Apr. 12, 2002

(65) Prior Publication Data

US 2002/0187311 A1 Dec. 12, 2002

Related U.S. Application Data

(60) Provisional application No. 60/283,517, filed on Apr. 12, 2001.

(51) Int. Cl.[7] ................................................ B41M 5/40
(52) U.S. Cl. .................................. 428/32.12; 428/32.22
(58) Field of Search ........................... 428/32.12, 32.22

(56) References Cited

U.S. PATENT DOCUMENTS

| | | | |
|---|---|---|---|
| 4,153,494 A | 5/1979 | Vilaprinyo Oliva ......... 156/230 |
| 4,473,422 A | 9/1984 | Parker et al. ............... 156/233 |
| 4,720,315 A | 1/1988 | Greenman ................... 156/233 |
| 4,804,430 A | 2/1989 | Miekka et al. .............. 156/233 |
| 4,825,025 A | 4/1989 | Seiferth ....................... 219/730 |
| 5,055,150 A | 10/1991 | Rosenfeld et al. .......... 156/150 |
| 5,064,692 A | 11/1991 | Hofmann et al. ........... 427/361 |
| 5,095,186 A | 3/1992 | Russell et al. .............. 219/730 |
| 5,098,495 A | 3/1992 | Smits et al. ................. 156/150 |
| 5,427,235 A | 6/1995 | Powell et al. ............... 206/245 |
| 5,634,669 A | 6/1997 | Colgate, Jr. .................. 283/58 |
| 5,759,683 A | 6/1998 | Boswell ....................... 428/334 |
| 5,827,615 A | 10/1998 | Touhsaent et al. .......... 428/463 |
| 5,888,640 A | 3/1999 | Marotta et al. ........... 428/308.4 |
| 5,888,697 A | 3/1999 | Fan .......................... 430/273.1 |
| 5,899,144 A | 5/1999 | Parks .......................... 101/129 |
| 5,932,325 A * | 8/1999 | Ebihara et al. .............. 428/209 |
| 5,981,011 A | 11/1999 | Overcash et al. ........... 428/40.9 |
| 6,008,827 A | 12/1999 | Fotland ....................... 347/120 |
| 6,013,353 A | 1/2000 | Touhsaent ................... 428/203 |
| 6,028,028 A | 2/2000 | Nitta ........................... 503/200 |
| 6,071,621 A | 6/2000 | Falaas et al. .............. 428/425.8 |
| 6,165,571 A | 12/2000 | Lykke ......................... 428/35.8 |
| 6,193,831 B1 | 2/2001 | Overcash et al. ........... 156/230 |
| 6,194,032 B1 | 2/2001 | Svedberg et al. ........... 427/304 |
| 6,244,701 B1 * | 6/2001 | Moriya et al. .............. 347/105 |
| 6,395,375 B1 | 5/2002 | Imamura et al. ............ 428/195 |
| 6,461,422 B1 * | 10/2002 | Yang et al. ............. 106/287.35 |
| 2001/0009174 A1 * | 7/2001 | Dinkel et al. ............... 156/238 |

FOREIGN PATENT DOCUMENTS

WO          82/03202          9/1982

* cited by examiner

Primary Examiner—B. Shewareged
(74) Attorney, Agent, or Firm—Renner, Otto, Boisselle & Sklar, LLP

(57) ABSTRACT

This invention relates to an inkjet substrate comprising a polymeric core having a first and second surface, an inkjet coating on the first surface and a metallized layer covering at least a portion of the second surface. The invention also relates to support substrates that are adhered to the inkjet substrate. Additionally the invention relates to methods of making the inkjet substrate and methods of using the same. The present invention provides a metallic appearance to ordinary inkjet printing to provide unique and special print effects. These substrates are useful for printing paper substrates, greeting cards, and novelties, such as buttons and magnets, binders, labels, index products, etc.

31 Claims, 3 Drawing Sheets

METALLIZED INKJET SUBSTRATES AND METHODS OF MAKING THE SAME

This application claim benefit of 60/283,517 filed Apr. 12, 2001

TECHNICAL FIELD OF THE INVENTION

This invention relates to substrates that are useful with inkjet printers and inks, articles made from the substrate and methods of making the same. More specifically, the invention relates to substrates that comprise a polymeric core with an inkjet coating on one surface and a metallized layer on the opposite surface.

BACKGROUND OF THE INVENTION

It is often desirable to have metallic effects when printing. Metallic effects are obtained using metallic inks or embossing techniques. These methods require special equipment and are expensive. It would be desirable to have a means for obtaining metallic effects with standard office or residential printers.

Inkjet printers have become popular for both commercial and residential uses. These printers are relatively low cost and readily available. These printers are used in many areas of application. Ink-jet technology utilizes a liquid based delivery system in which the ink pigments or dyes are delivered to a substrate together with a liquid. The substrate usually has a topcoat that contains at least one absorbent material to remove the liquid of the ink-jet ink. The conventional ink-jet printing technology is based on liquid based inks, such as water, solvent, or oil based inks. Because of the delivery system, metallic inks are not usable with inkjet printers. Without the metallic pigments, special printing effects are not possible with current inkjet printing systems. The ink of the inkjet printing system contains dyes that produce the colors. The dyes have a flat matte character when printed onto substrates like paper or cardstock.

It would be desirable to produce metallic printing effects with inkjet printers. The increasing use of personal computers for preparing greeting cards, buttons and other items has lead to a need to produce special metallic printing effects with standard inkjet printing technology.

SUMMARY OF THE PREFERRED EMBODIMENTS

This invention relates to an inkjet substrate comprising a polymeric core having a first and second surface, an inkjet coating on the first surface and a metallized layer covering at least a portion of the second surface. The invention also relates to support substrates that are adhered to the inkjet substrate. Additionally the invention relates to methods of making the inkjet substrate and methods of using the same.

The present invention provides a metallic appearance to ordinary inkjet printing to provide unique and special print effects. These substrates are useful for printing paper substrates, greeting cards, and novelties, such as buttons and magnets, binders, labels, index products, etc.

DETAILED DESCRIPTION OF THE PREFERRED EMBODIMENTS

Figure 1:
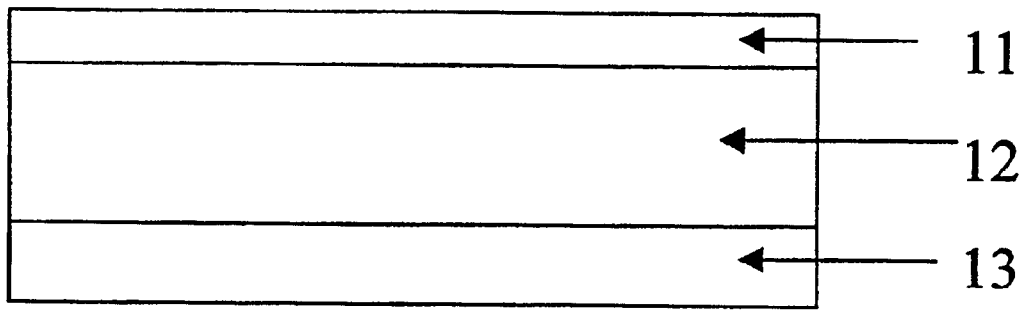
FIG. 1 is a cross section of an inkjet printable substrate having a inkjet coating, a polymeric core and a metallized layer.

As described herein, the inkjet substrates provide a unique printing appearance. The dyes of the inkjet inks produce a pearlescent quality that gives a metallic finish to the printed material. The inventors have discovered a way of providing a means for providing a metallic look printing with commonly available inkjet printers and materials. It is believed that when the printing is applied to the surface of the inkjet coating, the coating becomes translucent and allows the metallized layer to show through in the printed areas.

As described above the inkjet substrate has a polymeric core layer. This core layer is made from polymers which are capable of being metallized. The polymeric core may be a single polymer or blend of polymers. The polymeric core may be a single layer or multiple layers. The polymeric core may be extruded, or either coextruded or laminated together for multilayer structures. The polymeric core may be clear or colored, such as light colors including white, yellow, and beige. The core layer typically has a thickness from about 0.1 to about 10 mils, or from about 0.3 to about 5 mils, or from about 0.5 to about 2.5 mils. In one embodiment, the inkjet substrate is a thin film (i.e. less than about 2.2 mils). In this embodiment, the thickness of the polymeric core is from about 0.1 to about 2 mils, or from about 0.5 to about 1.8 mils. Here and elsewhere in the specification and claims, the range and ratio limits may be combined.

The polymeric core may include a polyolefin, thermoplastic polymers of ethylene and propylene, a polyester, a polycarbonate, a polystyrene, a polyurethane, a polyacryl, a polymethacryl, a polyvinyl alcohol, a polyamide, a poly (ethylene vinyl alcohol), a vinyl acetate homopolymer, co- or terpolymer, an ionomer, and mixtures thereof.

In one embodiment, the polymeric core material is a polyolefin. The polyolefins which can be utilized as the polymeric core material include polymers and copolymers of ethylene, propylene, 1-butene, etc., or blends of mixtures of such polymers and copolymers. In one embodiment, the polyolefins comprise polymers and copolymers of ethylene and propylene. In another embodiment, the polyolefins comprise propylene homopolymers, and copolymers such as propylene-ethylene and propylene-1-butene copolymers. Blends of polypropylene and polyethylene with each other, or blends of either or both of them with polypropylene-polyethylene copolymer also are useful. In another embodiment, the polyolefin film materials are those with a very high propylenic content, either polypropylene homopolymer or propylene-ethylene copolymers or blends of polypropylene and polyethylene with low ethylene content, or propylene-1-butene copolymers or blend of polypropylene and poly-1-butene with low butene content.

Various polyethylenes can be utilized as the polymeric core material including low, medium, and high density polyethylenes. An example of a useful low density polyethylene (LDPE) is Rexene 1017 available from Huntsman.

The propylene homopolymers which can be utilized as the polymeric core material in the constructions of the invention, either alone, or in combination with a propylene copolymer as described herein, include a variety of propylene homopolymers such as those having melt flow index (MFI) from about 0.5 to about 20 as determined by ASTM Test D 1238, condition L. A number of useful propylene homopolymers are available commercially from a variety of sources, and some useful polymers include: 5A97, available from Union Carbide and having a melt flow of 12.0 g/10 min and a density of 0.90 g/cm$^3$; DX5E66, also available from Union Carbide and having an MFI of 8.8 g/10 min and a density of 0.90 g/cm$^3$; and WRD5-1057 from Union Carbide having an MFI of 3.9 g/10 min and a density of 0.90 g/cm$^3$. Useful commercial propylene homopolymers are also available from Fina and Montel.

A variety of propylene copolymers are available and useful in the invention. The propylene copolymers generally comprise copolymers of propylene and up to 10% or even 20% by weight of at least one other alpha olefin such as ethylene, 1-butene, 1-pentene, etc. In one embodiment, the propylene copolymers are propylene-ethylene copolymers with an ethylenic content from about 0.2% to about 10% by weight. Such copolymers are prepared by techniques well known to those skilled in the art, and these copolymers are available commercially from, for example, Union Carbide. A propylene-ethylene copolymer containing about 3.2% by weight of ethylene is available from Union Carbide under the designation D56D20. Another Union Carbide propylene-ethylene copolymer is D56D8, which contains 5.5% by weight of ethylene.

In another embodiment, the polymeric core comprises at least one thermoplastic copolymer or terpolymer derived from ethylene or propylene and a functional monomer selected from the group consisting of alkyl acrylate, acrylic acid, alkyl acrylic acid, and combinations of two or more thereof. In one embodiment, the functional monomer is selected from alkyl acrylate, acrylic acid, alkyl acrylic acid, and combinations of two ore more thereof. In one embodiment, the polymeric core is characterized by the absence of ethylene vinyl actetate resins, and acid or acid/acrylate-modified ethylene vinyl acetate resins. The alkyl groups in the alkyl acrylates and the alkyl acrylic acids typically contain 1 to about 8 carbon atoms, and, in one embodiment, 1 to about 2 carbon atoms. The functional monomer(s) component of the copolymer or terpolymer ranges from about 1 to about 15 mole percent, and, in one embodiment, about 1 to about 10 mole percent of the copolymer or terpolymer molecule. Examples include: ethylene/methyl acrylate copolymers; ethylene/ethylacrylate copolymers; ethylene/butyl acrylate copolymers; ethylene/methacrylic acid copolymers; ethylene/acrylic acid copolymers; anhydride-modified low density polyethylenes; anhydride-modified linear low density polyethylene, and mixtures of two or more thereof.

Ethylene acid copolymers are available from DuPont under the tradename Nucrel can also be used. These include Nucrel 0407, which has a methacrylic acid content of 4% by weight and a melting point of 109° C., and Nucrel 0910, which has a methacrylic acid content of 8.7% by weight and a melting point of 100° C. The ethylene/acrylic acid copolymers available from Dow Chemical under the tradename Primacor are also useful. These include Primacor 1430, which has an acrylic acid monomer content of 9.5% by weight, a melting point of about 97° C. and a $T_g$ of about −7.7° C. The ethylene/methyl acrylate copolymers available from Chevron under the tradename EMAC can be used. These include EMAC 2205, which has a methyl acrylate content of 20% by weight and a melting point of 83° C., and EMAC 2268, which has a methyl acrylate content of 24% by weight, a melting point of about 74° C. and a $T_g$ of about −40.6° C.

In one embodiment, the polymeric core comprises at least one polyester. Polyesters are prepared from various glycols (including ethylene glycol, propylene glycol, neopentyl glycol, etc.) or polyols (glycerol, trimethylolpropane, pentaeythritol, etc.) and one or more aliphatic or aromatic carboxylic acids. Polyethylene terephthalate (PET) and PETG (PET modified with cyclohexanedimethanol) are useful and are available from a variety of commercial sources including Eastman Chemical. For example, Kodar 6763 is a PETG available from Eastman Chemical. Another useful polyester from duPont is Selar PT-8307 which is polyethylene terephthalate. Another useful polyester is polyethylene naphthanate.

Particularly useful polyamide resins include resins available from EMS American Grilon Inc., Sumter, S.C. under the general tradename Grivory such as CF6S, CR-9, XE3303 and G-21. Grivory G-21 is an amorphous nylon copolymer having a glass transition temperature of 125° C., a melt flow index (DIN 53735) of 90 ml/10 min and an elongation at break (ASTM D638) of 15. Grivory CF65 is a nylon 6/12 film grade resin having a melting point of 135° C., a melt flow index (DIN 53735) of 50 ml/10 min, and an elongation at break in excess of 350%. Grilon CR9 is another nylon 6/12 film grade resin having a melting point of 200° C., a melt flow index (DIN 53735) of 200 ml/10 min, and an elongation at break at 250%. Grilon XE 3303 is a nylon 6.6/6.10 film grade resin having a melting point of 200° C., a melt flow index (DIN 53735) of 60 ml/10 min, and an elongation at break of 100%. Other useful polyamide resins include those commercially available from, for example, Union Camp of Wayne, New Jersey under the Uni-Rez product line, and dimer-based polyamide resins available from Bostik, Emery, Fuller, Henkel (under the Versamid product line). Other suitable polyamides include those produced by condensing dimerized vegetable acids with hexamethylene diamine. Examples of polyamides available from Union Camp include Uni-Rez 2665; Uni-Rez 2620; Uni-Rez 2623; and Uni-Rez 2695.

In one embodiment, the polymeric core comprises at least one polyimide. Examples of a polyimide films include NOVAU polyimide available from Mitsubishi Chemical Industries Ltd. of Tokyo, Japan and KAPTON polyimide, available from Du Pont Electronics of Wilmington, Del.

In another embodiment, the polymeric core comprises at least one polystyrene. Polystyrenes include homopolymers as well as copolymers of styrene and substituted styrene, such as alpha-methyl styrene. Examples of styrene copolymers and terpolymers include: acrylonitrile-butene-styrene (ABS); styrene-acrylonitrile copolymers (SAN); styrene butadiene (SB); styrene-maleic anhydride (SMA); and styrene-methyl methacrylate (SMMA); etc. An example of a useful styrene copolymer is KR-10 from Phillip Petroleum Co. KR-10 is believed to be a copolymer of styrene with 1,3-butadiene.

In one embodiment, the polymeric core is at least one polyurethane. The polyurethanes include aliphatic as well as aromatic polyurethanes. The polyurethane is typically the reaction products of the following components: (A) a polyisocyanate having at least two isocyanate (—NCO) functionalities per molecule with (B) at least one isocyanate reactive group such as a polyol having at least two hydroxy groups or an amine. Suitable polyisocyanates include diisocyanate monomers, and oligomers.

Useful polyurethanes include aromatic polyether polyurethanes, aliphatic polyether polyurethanes, aromatic polyester polyurethanes, aliphatic polyester polyurethanes, aromatic polycaprolactam polyurethanes, and aliphatic polycaprolactam polyurethanes. Particularly useful polyurethanes include aromatic polyether polyurethanes, aliphatic polyether polyurethanes, aromatic polyester polyurethanes, and aliphatic polyester polyurethanes.

Examples of commecial polyurethanes include Sancure 2710® and/or Avalure UR 445® (which are equivalent copolymers of polypropylene glycol, isophorone diisocyanate, and 2,2-dimethylolpropionic acid, having the International Nomenclature Cosmetic Ingredient name "PPG-17/PPG-34/IPDI/DMPA Copolymer"), Sancure 878®, Sancure 815®, Sancure 1301®, Sancure 2715®, Sancure 1828®, Sancure 2026®, Sancure 1818®, Sancure 853®, Sancure 830®, Sancure 825®, Sancure 776®, Sancure 850®, Sancure 12140®, Sancure 12619®, Sancure 835®, Sancure 843®, Sancure 898®, Sancure 899®, Sancure 1511®, Sancure 1514®, Sancure 1517®, Sancure 1591®, Sancure 2255®, Sancure 2260®, Sancure 2310®, Sancure 2725®, and Sancure 12471® (all of which are commercially available from BF Goodrich, Cleveland, Ohio), Bayhydrol DLN (commercially available from Bayer Corp., McMurray, Pa.), Bayhydrol LS-2033 (Bayer Corp.), Bayhydrol 123 (Bayer Corp.), Bayhydrol PU402A (Bayer Corp.), Bayhydrol 110 (Bayer Corp.), Witcobond W-320 (commercially available from Witco Performance Chemicals), Witcobond W-242 (Witco Performance Chemicals), Witcobond W-160 (Witco Performance Chemicals), Witcobond W-612 (Witco Performance Chemicals), Witcobond W-506 (Witco Performance Chemicals), NeoRez R-600 (a polytetramethylene ether urethane extended with isophorone diamine commercially available from Avecia, formerly Avecia Resins), NeoRez R-940 (Avecia Resins), NeoRez R-960 (Avecia Resins), NeoRez R-962 (Avecia Resins), NeoRez R-966 (Avecia Resins), NeoRez R-967 (Avecia Resins), NeoRez R-972 (Avecia Resins), NeoRez R-9409 (Avecia Resins), NeoRez R-9637 (Avecia), NeoRez R-9649 (Avecia Resins), and NeoRez R-9679 (Avecia Resins).

Particularly useful polyurethanes are aliphatic polyether polyurethanes. Examples of such aliphatic polyether polyurethanes include Sancure 2710® and/or Avalure UR 445®, Sancure 878®, NeoRez R-600, NeoRez R-966, NeoRez R-967, and Witcobond W-320.

In one embodiment, the polymeric core comprises at least one polyester polyurethane. Examples of these polymeric core include those sold under the names "Sancure 2060" (polyester-polyurethane), "Sancure 2255" (polyester-polyurethane), "Sancure 815" (polyester-polyurethane), "Sancure 878" (polyether-polyurethane) and "Sancure 861" (polyether-polyurethane) by the company Sanncor, under the names "Neorez R-974" (polyester-polyurethane), "Neorez R-981" (polyester-polyurethane) and "Neorez R-970" (polyether-polyurethane) by the company ICI, and the acrylic copolymer dispersion sold under the name "Neocryl XK-90" by the company Avecia.

In another embodiment, the polymeric core is a polyacryl or polymethacryl resin. As used herein, a "polyacryl" includes polyacrylates, polyacrylics, or polyacrylamides, and "polymethacryl" includes polymethacrylates, polymethacrylics, or polymethacrylamides. These resins includes those derived from acrylic acid, acrylate esters, acrylamide, methacrylic acid, methacrylate esters, and methacrylamide. The acrylate and methacrylate ester generally contain from 1 to about 30 carbon atoms in the pendant group, or from 1 to about 18, or from 2 to about 12 carbon atoms in the pendant group.

Examples of commercial polyacryls and polymethacryls include Gelvae® 2497 (commercially available from Monsanto Co., St. Louis, Mo.), Duraplus® 2 (commercially available from Rohm & Haas Co., Philadelphia, Pa.), Joncryl® 95 (commercially available from S. C. Johnson Polymer, Sturtevant, Wis.), SCX-1537 (S. C. Johnson Polymer), SCX-1959 (S. C. Johnson Polymer), SCX-1965 (S. C. Johnson Polymer), Joncryl® 530 (S. C. Johnson Polymer), Joncryl® 537 (S. C. Johnson Polymer), Glascol LS20 (commercially available from Allied Colloids, Suffolk, Va.), Glascol C37 (Allied Colloids), Glascol LS26 (Allied Colloids), Glascol LS24 (Allied Colloids), Glascol LE45 (Allied Colloids), Carboset® CR760 (commercially available from BF Goodrich, Cleveland, Ohio), Carboset® CR761 (BF Goodrich), Carboset® CR763 (BF Goodrich), Carboset® 765 (BF Goodrich), Carboset® 19X2 (B1F Goodrich), Carboset® XL28 (BF Goodrich), Hycar 26084 (BF Goodrich), Hycar 26091 (BF Goodrich), Carbobond 26373 (BF Goodrich), Neocryl® A-601 (commercially available from Avecia Resins, Wilmington, Mass.)Neocryl® A-612 (Avecia Resins), Neocryl® A-6044 (Avecia Resins), Neocryl® A-622 (Avecia Resins), Neocryl® A-623 (Avecia Resins), Neocryl® A-634 (Avecia Resins), and Neocryl® A-640 (Avecia Resins).

Polycarbonates also are useful in the polymeric core. These polycarbonates are available from the Dow Chemical Co. (Calibre), G.E. Plastics (Lexan) and Bayer (Makrolon). Most commercial polycarbonates are obtained by the reaction of bisphenol A and carbonyl chloride in an interfacial process. Molecular weights of the typical commercial polycarbonates vary from about 22,000 to about 35,000, and the melt flow rates generally are in the range of from 4 to 22 g/10 min.

In another embodiment, the polymeric core is a polyvinylchloride resin (sometimes referred to herein as PVC resins). These resins are well known and are either homopolymers of vinyl chloride or copolymers of vinyl chloride with a minor amount by weight of one or more ethylenically-unsaturated comonomers which are copolymerizable with the vinyl chloride. Examples of these ethylenically-unsaturated comonomers include vinyl halides, such as vinyl fluoride and vinyl bromide; alpha-olefins, such as ethylene, propylene and butylene; vinyl esters, such as vinyl acetate, vinyl propionate, vinyl butyrate and vinyl hexanoate, or partially hydrolyzed products thereof, such as vinyl alcohol; vinyl ethers, such as methyl vinyl ether, propyl vinyl ether and butyl vinyl ether; acrylic esters, such as methyl acrylate, ethyl acrylate, methyl methacrylate and butyl methacrylate and other monomers, such as acrylonitrile, vinylidene chloride and dibutyl maleate. Such resins are generally known and many are commercially available. A particularly useful polyvinylchloride resin is the homopolymer of vinyl chloride.

Examples of polyvinylchloride resins that are commercially available include GEON® 92, a medium high molecular weight porous suspension PVC resin; GEON® 128, a high molecular weight dispersion grade polyvinylchloride resin; and GEON® 11X 426FG, a medium molecular weight PVC resin. The GEON® resins are available from the Geon Company. The number average molecular weights of the PVC resins useful in the present invention may range from about 20,000 up to about 80,000, and a typical range of about 40,000 to about 60,000.

In another embodiment, the polymeric core comprises at least one ionomer. Ionomers are polyolefins containing ionic bonding of molecular chains. Ionomer resins available from DuPont under the tradename SURLYN® can also be used. These are identified as being derived from sodium, lithium or zinc and copolymers of ethylene and methacrylic acid. These include Surlyn 1601, which is a sodium containing ionomer having a melting point of 98° C., Surlyn 1605, which is a sodium containing ionomer having a melting point of about 90° C. and a $T_g$ of about −20.6° C., Surlyn 1650, which is a zinc containing ionomer having a melting point of 97° C., Surlyn 1652 which is a zinc containing ionomer having a melting point of 100° C., Surlyn 1702, which is a zinc containing ionomer having a melting point of 93° C., Surlyn 1705-1, which is a zinc containing ionomer having a melting point of 95° C., Surlyn 1707, which is a sodium containing ionomer having a melting point of 92° C., Surlyn 1802, which is a sodium containing ionomer having a melting point of 99° C., Surlyn 1855, which is a zinc containing ionomer having a melting point of 88° C., Surlyn 1857, which is a zinc containing ionomer having a melting point of 87° C., and Surlyn 1901, which is a sodium containing ionomer having a melting point of 95° C.

The polymeric core material may contain inorganic fillers and other organic or inorganic additives to provide desired properties such as appearance properties (opaque or colored films), durability and processing characteristics. Nucleating agents can be added to increase crystallinity and thereby increase stiffness. Examples of useful materials include calcium carbonate, titanium dioxide, metal particles, fibers, flame retardants, antioxidant compounds, heat stabilizers, light stabilizers, ultraviolet light stabilizers, antiblocking agents, processing aids, acid acceptors, etc.

Various nucleating agents and pigments can be incorporated into the films of the present invention. The amount of nucleating agent added should be an amount sufficient to provide the desired modification of the crystal structure while not having an adverse effect on the desired properties of the films. Nucleating agents which have been used heretofore for polymer films include mineral nucleating agents and organic nucleating agents. Examples of mineral nucleating agents include carbon black, silica, kaolin and talc. The organic nucleating agents which have been suggested as useful in polyolefin films include salts of aliphatic mono-basic or di-basic acids or aryalkyl acids such as sodium succinate, sodium glutarate, sodium caproate, sodium 4-methylvalerate, aluminum phenyl acetate, and sodium cinnamate. Alkali metal and aluminum salts of aromatic and alicyclic carboxylic acids such as aluminum benzoate, sodium or potassium benzoate, sodium betanaphtholate, lithium benzoate and aluminum tertiary-butyl benzoate also are useful organic nucleating agents. Substituted sorbitol derivatives such as bis (benzylidene) and bis (alkylbenzilidine) sorbitols wherein the alkyl groups contain from about 2 to about 18 carbon atoms are useful nucleating agents. More particularly, sorbitol derivatives such as 1,3,2,4-dibenzylidene sorbitol, 1,3,2,4-di-para-methylbenzylidene sorbitol, and 1,3,2,4-di-para-methylbenzylidene sorbitol are effective nucleating agents for polypropylenes. Useful nucleating agents are commercially available from a number of sources. Millad 8C-41-10, Millad 3988 and Millad 3905 are sorbitol nucleating agents available from Milliken Chemical Co.

The amounts of nucleating agent incorporated into the polymeric core of the present invention are generally quite small and range from about 100 to about 6000 ppm of the film. In one embodiment, the amount of nucleating agent is within the range of about 1000 to about 5000 ppm.

Inkjet Coating

The polymeric core has a first and second surface. On the first surface is a inkjet coating. The inkjet coatings are those known to the art for improving the adhesion and print quality of inkjet inks. These coatings are generally prepared by combining a binder with a filler and forming a solution or dispersion. This solution or dispersion is applied to the polymeric core and cured by removing the solvent.

These coatings generally comprise a binder, which is typically a polymer, and a pigment or other absorbent materials. The inkjet coating acts to improve the absorption of the liquid carrier of the inkjet ink. The binders include starch, water-soluble resins such as polyvinyl alcohol, and film forming emulsions such as SBR latex, ethylene-vinyl acetate copolymer latex and acrylic resin latex, polysaccharides and derivatives thereof (including starches, cellulosic polymers, dextran and the like); polypeptides (including collagen and gelatin); poly(vinyl alcohol), poly(vinyl phosphate), poly(vinyl pyrrolidone), vinyl-pyrrolidone-vinyl acetate copolymers, vinyl alcohol-vinyl acetate copolymers, vinyl pyrrolidone-styrene copolymers, and poly (vinyl amine), and cationic film-forming binders such as quaternized vinyl pyrrolidone-dimethylaminoethyl methacrylate copolymer, dimethylaminoethylmethacrylate-co-methylmethacrylate, polydiallyidimethyl ammonium chloride and quaternized aminoacrylate polymers, dextran (e.g., dialkyl aminoalkyl dextran, amino dextran, and the like), carrageenan, Karaya gum, xanthan, guar and guar derivatives, (e.g., carboxyalkyl hydroxyalkyl guar, cationic guar, and the like), formaldehyde resins such as melamine-formaldehyde resin, urea-formaldehyde resin, alkylated urea-formaldehyde resin, and the like), acrylamide-containing polymers (e.g., poly(acrylamide), poly(N,N-dimethyl acrylamide), and the like), poly(alkyleneimine)-containing polymers (e.g., poly(ethyleneimine), poly (ethyleneimine)epichlorohydrin, alkoxylated poly (ethyleneimine), and the like), polyoxyalkylene polymers (e.g, poly(oxymethylene), poly(oxyethylene), ethylene oxide/propylene oxide copolymers, ethylene oxide/2-hydroxyethyl methacrylate/ethylene oxide and ethylene oxide/hydroxypropyl methacrylate/ethyleneoxide triblock copolymers, ethylene oxide-4-vinyl pyridine/ethylene oxide triblock copolymers, ethylene oxide-isoprene/ethylene oxide triblock copolymers, epichlorohydrin-ethylene oxide copolymer, and the like). Additional saccharide binders include cellulosic materials such as alkyl celluloses, aryl celluloses, hydroxy alkyl celluloses, alkyl hydroxy alkyl celluloses, hydroxy alkyl celluloses, dihydroxyalkyl cellulose, dihydroxyalkyl cellulose, hydroxy alkyl hydroxy alkyl cellulose, halodeoxycellulose, amino deoxycellulose, dialkylammonium halide hydroxy alkyl cellulose, hydroxyalkyl trialkyl ammonium halide hydroxyalkyl cellulose, dialkyl amino alkyl cellulose, carboxy alkyl cellulose salts, cellulose sulfate salts, carboxyalkylhydroxyalkyl cellulose and the like), etc.

Any of the above binders can be used in any effective relative amounts, although typically the binder represents about 1 wt. % to about 40 wt. %, in one embodiment about 1 wt. % to about 25 wt. %, and in another embodiment, about 1 wt. % to about 15 wt. % of the composition, after drying on a substrate.

The inkjet coating may also contain a filler. The filler increases the ink-absorbtivity and improves the print quality and water resistance of the dried coating, and enables the coating to be used with water-based inks containing a dye colorant, as well as pigmented, water-based inks. Examples of fillers include calcium carbonate, clay, kaolin, terra abla, talc, synthetic silica, alumina, aluminum hydroxide, zinc oxide, calcium silicate, synthetic silicate, titanium oxide, diatomaceous earth, barium sulfate, satin white, thermoset organic polymer particles (including particles of thermoset melamine-aldehyde polymer, thermoset resorcinol-aldehyde polymer, thermoset phenol-resorcinol-aldehyde polymer, thermoset (meth)acrylate polymer, or thermoset styrene-divinylbenzene polymer), amorphous silica, satin white, aluminum silicate, smectite, magnesium silicate, magnesium carbonate, magnesium oxide, metal oxides include alumina, silica (including amorphous precipitated silica, colloidal silica, precipitated silica, etc.), titania, zirconia, hafnia, yftria and mixtures of two or more thereof.

The filler particles usually have a maximum dimension of less than about 500 nanometers. Often the filler particles have a maximum dimension of less than about 100 nanometers. Frequently the maximum dimension is less than about 50 nanometers or less than about 20 nanometers.

An example of a useful inkjet coating is described in U.S. Pat. No. 6,153,288, issued in the name of Shih. This patent is incorporated by reference for its disclosure of inkjet coating compositions. This coating is an ink-receptive, coatable composition which comprises a pigment dispersed in or mixed with a binder which comprises an ethylene-vinyl acetate emulsion polymer and at least one water soluble, cationic polymer. The cationic polymer fixes acid dye colorants in water-based inks, and diminishes dye diffusion. In one embodiment, the binder includes at least two water soluble, cationic polymers, namely, (1) a polymerized diallyldimethylammonium compound and (2) a copolymer of dimethylaminoethyl acrylate or methacrylate and at least one hydroxy-lower organic acrylate or methacrylate, with hydroxyethyl acrylate (HEA) and hydroxyethyl methacrylate (HEMA) being useful. In some embodiments, a nonionic or cationic surfactant is included within the binder mixture to enhance print quality of the coating. A useful ink-receptive composition has, on a percent by weight (dry weight) basis, about 15 to about 70% EVA emulsion polymer, about 5 to about 50% of at least one water soluble, cationic polymer, about 20 to about 60% pigment(s), and up to about 10% of one or more surfactants.

In another embodiment, the inkjet coating composition comprises a mixture of polyvinyl pyrrolidone, silica, and a chromium complex capable of crosslinking polyvinyl pyrrolidone, with the components preferably being dissolved or dispersed in a solvent, e.g., an alcohol, or a mixture of alcohol and water. A solvent, such as alcohol or a mixture of alcohol and water, are particularly useful. In water-free systems, a small amount of organic acid may be added to improve pot life. In mixed alcohol/water-based systems, it is useful to include a small amount of polyethylene imine, which acts as a mordant and improves the ink-receptivity of the composition.

In a first aspect of the invention, a coatable composition is provided and comprises a mixture of polyvinyl pyrrolidone, silica, and a chromium complex capable of crosslinking polyvinyl pyrrolidone. The components are typically dissolved or dispersed in a solvent. Other components can be added to improve pot life, coatability, and other properties as described below.

In general, the compositions contain, on a parts-by-weight basis, from about 2 to about 30% (or about 5 to about 20%) polyvinyl pyrrolidone, about 2 to about 10% (or about 3 to about 7%) silica, and about 0.25 to about 1% chromium complex. Where a solvent is present, it comprises from about 50 to about 95% (or about 75 to about 95%) of the composition.

It has been found that the molecular weight of the polyvinyl pyrrolidone (PVP) can affect the viscosity and solids content of the composition, which in turn affects the coating speed and cost of making ink-receptive products coated with the composition. In general, PVP having a K value from about 75 to 90 and a weight average molecular weight ($M_w$) from about 750,000 to 1,000,000 is particularly useful. PVP is available from a number of companies, including ISP Technologies, Inc. and BASF.

The silica component imparts ink absorptivity and ink permanency to the coated construction. Several types of silica are known, with varying pore size (and hence, varying ink-absorptivity), including fumed silica, precipitated silica, and silica gel. Silica gel has the highest pore volume and is particularly useful. A nonlimiting example is Gasil HP-39, from Crosfield Company (Joliet, Ill.). In clear label applications, if too much silica is present, or the silica particle size is too great, or the coat weight of the composition is too high, the resulting coated label stock will not exhibit the desired "touch clear" property (the ability to appear clear when pressed against a substrate, such as an envelope).

The chromium complex present in the composition is capable of crosslinking polyvinyl pyrrolidone. A nonlimiting example of such a complex is Quilon®C, made by E. I. du Pont de Nemours and Company. Other grades of Quilon® complexes are also available. Du Pont product literature describes Quilon® as "a solution, largely in isopropanol, of a dark green, chemically reactive complex in which a $C_{14}$–$C_{18}$ fatty acid is coordinated with trivalent chromium," Quilon® C has CAS Registry No. 65229-24-5. It has been described as pentahydroxy(tetradecanoato) dichromium.

A number of organic and mixed organic/aqueous solvents can be used to prepare coatable compositions according to the present invention. In one embodiment, the solvent is an alcohol. In another embodiment, the solvent is a mixture of alcohol and water. Alternatively, other organic solvents may be used. Although alcoholic compositions can be prepared using methanol or ethanol, in commercial-scale production an alcohol with a high boiling point, for example, n-butanol (b.p.=117.7° C.) is useful. In those embodiments where a mixture of alcohol and water is employed as the solvent, the alcohol is generally isopropanol, which is much more miscible with water than is n-butanol. Mixtures of isobutanol and n-butanol are also useful.

To improve the pot life of water-free compositions, it is helpful to add an organic acid, for example, acetic acid, prior to coating. Although not bound by theory, it is believed that the acid retards the chromium complex-catalyzed crosslinking of PVP at room temperature, thus improving the pot life of the composition and facilitating coating in conventional coaters. In organic solvent-based compositions lacking an acid, the viscosity of the composition may build undesirably with time, making it extremely difficult to coat the composition. If included, the organic acid is present in a positive amount up to about 5%, or from about 0.05% to about 5%, or about 0.1 to about 1%, based on the weight of all components.

The ink-receptivity of mixed alcohol/water-based systems can be improved by the addition of a mordant, such as polyethylene imine (PEI). For example, a positive amount up to about 25%, or from about 1 to about 10%, of an aqueous polyethylene imine solution is included in some embodiments of the invention. It has been found that adding neat PEI to the composition can cause gelling. This is avoided by pre-diluting the PEI with water.

The coatable compositions are prepared by mixing polyvinyl pyrrolidone, silica, chromium complex and other components (e.g., solvent, organic acid, PEI, etc.) using mixing techniques and apparatus well known in the art. The chromium complex, as well as any organic acid, is generally added to the composition just prior to coating. Once the components are mixed, the composition can be stored with continuous mixing for at least one month without chromium complex, and up to 8–10 hours with the complex.

The composition can be coated on a polymeric core using conventional coating techniques. Nonlimiting examples of such techniques include slot die, air knife, brush, curtain, extrusion, blade, floating knife, gravure, kiss roll, knife-over-blanket, knife-over-roll, offset gravure, reverse roll, reverse-smoothing roll, rod, and squeeze roll coating. The composition can also be applied to paper substrates in a size press, during paper manufacture. For label products, the composition can be applied using any conventional technique or process, including without limitation, coating "on-press" during the converting process (e.g., in concert with the processes of die-cutting, matrix stripping, etc.), coating "off-press" using a separate coater, and other application methods known in the art. After being coated or otherwise applied to a facestock or label stock, the coated construction is dried at room temperature or in an oven to remove most of the solvent and other volatile components.

The choice of which coating technique to use for a given application depends on several factors, including the cost and availability of equipment, the facestock or labelstock to be coated, the viscosity and solids content of the composition, the choice of solvent used, the desired coat weight, etc. For some applications, a solids content as high as 40% is acceptable, with 15 to 20% being somewhat more useful. Typical (but nonlimiting) values of the viscosity of the composition prior to coating range from about 500 to about 1,000 centipoise. In general, coat weights of from about 2 to about 30g/m$^2$, or about 5 to about 15 g/m$^2$, (measured on a dry basis) are useful. Coated clear film facestocks (e.g., polyester) are advantageously prepared with composition coat weights of from about 5 to about 15 g/m$^2$ (dry weight).

Four different ink-receptive coatable compositions were prepared by blending the components listed in Table 1 in a low shear blender for 15 minutes. Example 1 contains Quilon C. Example 2 is the same as Example 1, but additionally contains acetic acid. Example 3 contains Quilon C, no acetic acid, and a solvent consisting of a mixture of isopropyl alcohol, water, and polyethylene imine. Example 4 contains Quilon C, acetic acid, and a solvent consisting of a mixture of isopropanol and n-butanol.

TABLE 1

| Component | Examples 1–4 | | | |
|---|---|---|---|---|
| | Ex. 1 | Ex. 2 | Ex. 3 | Ex. 4 |
| | Parts-by-weight (wet weight) | | | |
| n-butanol | 89.8 | 88.8 | | 25.8 |
| Isobutanol | | | 79 | 60.2 |
| Water | | | 3.97 | |
| PVP[1] | 7 | 7 | 8.23 | 9.1 |

TABLE 1-continued

| Component | Examples 1–4 | | | |
|---|---|---|---|---|
| | Ex. 1 | Ex. 2 | Ex. 3 | Ex. 4 |
| | Parts-by-weight (wet weight) | | | |
| Silica gel[2] | 3 | 3 | 3.6 | 3.9 |
| Chromium complex[3] | 0.2 | 0.2 | 0.24 | 0.31 |
| Acetic acid | | 1 | | 1 |
| Polyethylene imine[4] | | | 5 | |
| Total | 100 | 100 | 100.04 | 100 |

[1]From ISP, Inc.; KValue: 90
[2]Gasil HP-39
[3]Quilon C
[4]20% by weight in water Metallized Layer As has been described the polymeric core layer has, on one surface, an inkjet coating. On the other or second surface, the polymeric core has a metallized layer. The metallized layer may cover either a portion of or all of the surface of the polymeric core layer. The metallized layer may be prepared from any metal which may be deposited on the polymer film. In one embodiment, the metallized layer is silver, gold or bronze in color. The metallized layer can be applied by vapor deposition over the back surface of the space coat. The thickness of the metallized layer depends on the particular metal used and is generally between about 500 and about 1000 nanometers. The metals used include silver, aluminum, etc.

Articles

Now referring to the drawings, FIG. 1 illustrates an inkjet substrate with a polymeric core 12 (1.2 mil clear PET) with a first and second surface, an inkjet coating 11 (Ex. 4 above) on the first surface of polymeric core 12 and a metallized layer 13 (30–50 nanometers aluminum) on the second surface of polymeric core 12. White PET may be used in place of clear PET.

Figure 2:
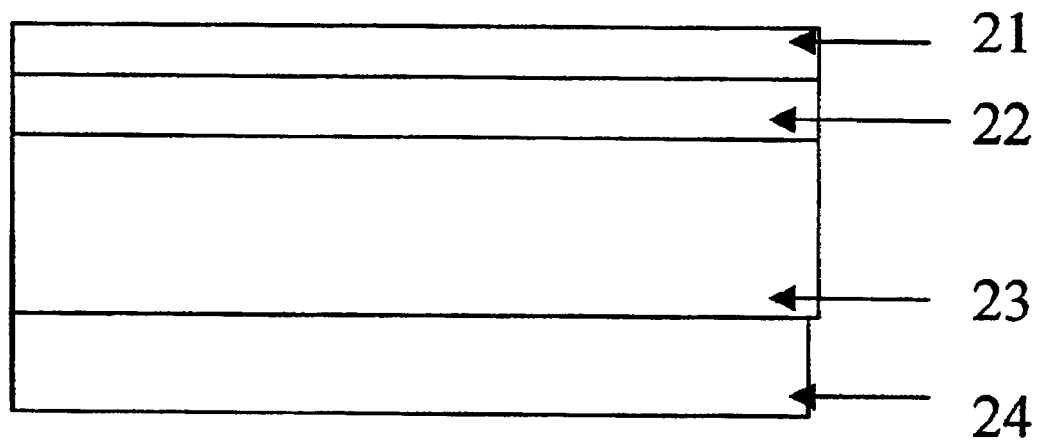
FIG. 2 is a cross section of an inkjet printable substrate having a inkjet coating, a polymeric core, a primer layer and a metallized layer.

FIG. 2 illustrates an inkjet substrate having a polymeric core layer 23 having an inkjet coating 21 which is adhered to primer coating 22. On the opposite surface of the polymeric core 23 is metallized layer 24. The inventors have found that the primer layer improves adhesion of the inkjet coating and improves print quality. The primer layer may be any polymer which improves adhesion. A particularly useful primer is sold by Morton International under the trade name Adcote®. Examples of Adcote® primers include Adcote® 61JH61A (a copolymer comprising about 67 mole percent (about 62% by weight) polystyrene and about 33 mole percent (about 38% by weight) poly(n-butyl acrylate), Morton International, Chicago, Ill.); Adcote® 56220 (30% solids emulsion of Surlyn® 56220, Morton International Inc. Chicago, Ill.); Adcote® 50C12 (22% solids emulsion of an ethylene acrylic acid polymer, Morton International Inc., Chicago, Ill.; Adcote® 50T4983 (25% solids emulsion of Dow's Primacor® 5980 ethylene acrylic acid resin, Morton International Inc., Chicago, Ill.); Adcote® 50T4990 (35% solids emulsion of Dow's Primacor ® 5990 ethylene acrylic acid resin, Morton International Inc., Chicago, Ill.); Adcote®69-100 (40% solids solution of Morton International) and Michelman Prime® 4983 (25% solids emulsion of Dow's Primacor® 5980 ethylene acrylic acid resin, Michelman, Inc., Cincinnati, Ohio). Adcote® 69-100 is particularly useful as a primer.

The inkjet substrates when printed have a metallic appearance when printed with inkjet inks. The colored dyes in the inks have a pearlescent quality. This quality of printing affords an aesthetically appealing appearance. The inkjet substrates may be printed and used in greeting cards, magnets, buttons or other articles which may desire the print features. The inkjet substrate may be place onto paper, cardstock, metal, wood, or other support substrates for it uses.

The inkjet substrate may be adhered to the support substrate through the use of adhesives. The inkjet substrate would normally be laminated to the support substrate for final use. The inkjet substrate may be printed either before or after application to the support substrate. For card and paper applications, the inkjet substrate may be laminated to the paper or cardstock before printing, provided that the printer is able to print the resulting laminate. The inkjet substrate may be laminated to the support substrate through a transfer tape or adhesive already present on the support substrate. A liner would be typically used to protect the adhesive on the support substrate.

In another embodiment, the inkjet substrate is coated with adhesive or is laminated to an adhesive to provide an adhesive inkjet substrate. When the adhesive is laminated to the inkjet substrate, the adhesive is typically supported on a releasable liner as is known to those in the art.

Figure 3:
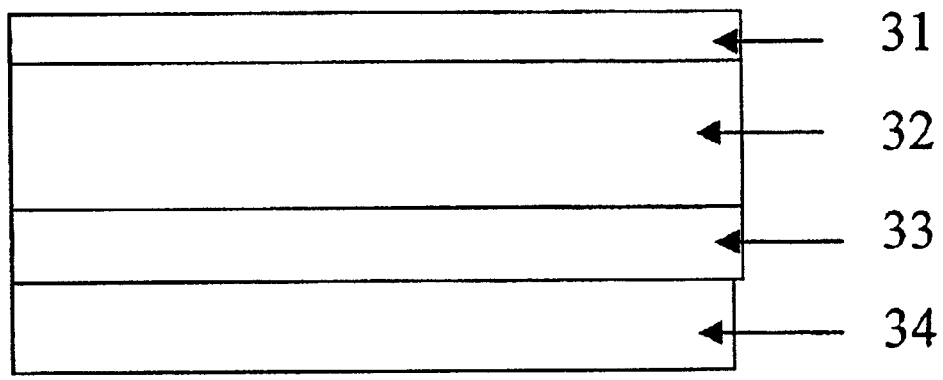
FIG. 3 is a cross section of an inkjet printable substrate having a inkjet coating, a polymeric core, a metallized layer, and an adhesive layer.

Referring to FIG. 3, the polymeric core 32 has on it surfaces inkjet coating 31 and metallized layer 33. Metallized 33 is adhered to adhesive layer 34. A liner may be present on the adhesive layer but is not shown in the figure.

Figure 4:
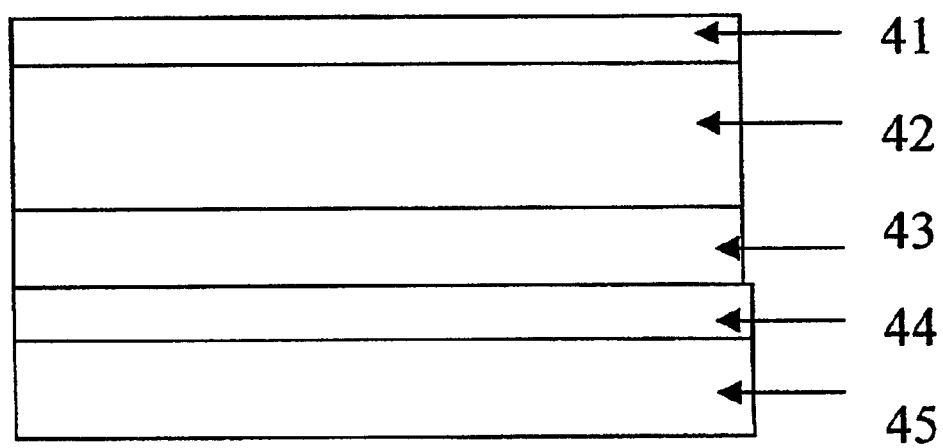
FIG. 4 is a cross section of an inkjet printable substrate having a inkjet coating, a polymeric core, a primer layer, a metallized layer, and an adhesive layer.

Referring to FIG. 4, the polymeric core 43 has on its surfaces primer coating 42 and metallized layer 43. On the opposite surface of primer layer 42 is inkjet coating 41. The opposite surface of metallized layer 44 is adhered to adhesive layer 45.

The adhesive may be a heat-activated adhesive, a hot melt adhesive, or a pressure sensitive adhesive (PSA). The adhesives may generally be classified into the following categories: 1) Random copolymer adhesives, such as those based upon acrylate and/or methacrylate copolymers, α-olefin copolymers, silicone copolymers, chloroprene/acrylonitrile copolymers, and the like; 2) Block copolymer adhesives, including those based upon linear block copolymers (i.e., A-B and A-B-A type), branched block copolymers, star block copolymers, grafted or radial block copolymers, and the like; and 3) Natural and synthetic rubber adhesives. A description of useful adhesives may be found in *Encyclopedia of Polymer Science and Engineering*, Vol. 13., Wiley-lnterscience Publishers (New York, 1988). Additional description of useful adhesives may be found in *Encyclopedia of Polymer Science and Technology*, Vol. 1, Interscience Publishers (New York, 1964).

Commercially available pressure-sensitive adhesives are useful in the invention. Examples of these adhesives include the hot melt pressure-sensitive adhesives available from H. B. Fuller Company, St. Paul, Minn., as HM-1597, HL-2207-X, HL-2115X, HL-2193-X. Other useful commercially available pressure-sensitive adhesives include those available from Century Adhesives Corporation, Columbus, Ohio.

Conventional PSAs, including silicone-based PSAs, rubber-based PSAs, and acrylic-based PSAs are useful. Another commercial example of a hot melt adhesive is H2187-01, sold by Ato Findley, Inc., of Wauwatusa, Wis. In addition, rubber based block copolymer PSAs described in U.S. Pat. No. 3,239,478 (Harlan) also can be utilized in the coextruded adhesive constructions of the present invention, and this patent is hereby incorporated by a reference for its disclosure of such hot melt adhesives.

In one embodiment, the pressure sensitive adhesive utilized in the present invention comprise rubber based elastomer materials such as linear, branched, grafted, or radial block copolymers represented by the diblock structures A-B, the triblock A-B-A, the radial or coupled structures $(A-B)_n$, and combinations of these where A represents a hard thermoplastic phase or block which is non-rubbery or glassy or crystalline at room temperature but fluid at higher temperatures, and B represents a soft block which is rubbery or elastomeric at service or room temperature. These thermoplastic elastomers may comprise from about 75% to about 95% by weight of rubbery segments and from about 5% to about 25% by weight of non-rubbery segments.

The non-rubbery segments or hard blocks comprise polymers of mono- and polycyclic aromatic hydrocarbons, and more particularly vinyl-substituted aromatic hydrocarbons which may be monocyclic or bicyclic in nature. The preferred rubbery blocks or segments are polymer blocks of homopolymers or copolymers of aliphatic conjugated dienes. Rubbery materials such as polyisoprene, polybutadiene, and styrene butadiene rubbers may be used to form the rubbery block or segment. Particularly preferred rubbery segments include polydienes and saturated olefin rubbers of ethylene/butylene or ethylene/propylene copolymers. The latter rubbers may be obtained from the corresponding unsaturated polyalkylene moieties such as polybutadiene and polyisoprene by hydrogenation thereof.

The block copolymers of vinyl aromatic hydrocarbons and conjugated dienes which may be utilized include any of those which exhibit elastomeric properties. The block copolymers may be diblock, triblock, multiblock, starblock, polyblock or graftblock copolymers. Throughout this specification and claims, the terms diblock, triblock, multiblock, polyblock, and graft or grafted-block with respect to the structural features of block copolymers are to be given their normal meaning as defined in the literature such as in the *Encyclopedia of Polymer Science and Engineering*, Vol. 2, (1985) John Wiley & Sons, Inc., New York, pp. 325–326, and by J. E. McGrath in *Block Copolymers, Science Technology*, Dale J. Meier, Ed., Harwood Academic Publishers, 1979, at pages 1–5.

The block copolymers may be prepared by any of the well-known block polymerization or copolymerization procedures including sequential addition of monomer, incremental addition of monomer, or coupling techniques as illustrated in, for example, U.S. Pat. Nos. 3,251,905; 3,390,207; 3,598,887; and 4,219,627. As well known, tapered copolymer blocks can be incorporated in the multi-block copolymers by copolymerizing a mixture of conjugated diene and vinyl aromatic hydrocarbon monomers utilizing the difference in their copolymerization reactivity rates. Various patents describe the preparation of multi-block copolymers containing tapered copolymer blocks including U.S. Pat. Nos. 3,251,905; 3,639,521; and 4,208,356, the disclosures of which are hereby incorporated by reference.

Conjugated dienes which may be utilized to prepare the polymers and copolymers are those containing from 4 to about 10 carbon atoms and more generally, from 4 to 6 carbon atoms. Examples include from 1,3-butadiene, 2-methyl-1,3-butadiene (isoprene), 2,3-dimethyl-1,3-butadiene, chloroprene, 1,3-pentadiene, 1,3-hexadiene, etc. Mixtures of these conjugated dienes also may be used. In one embodiment, the dienes are isoprene and 1,3-butadiene.

Examples of vinyl aromatic hydrocarbons which may be utilized to prepare the copolymers include styrene and the various substituted styrenes such as o-methylstyrene, p-methylstyrene, p-tert-butylstyrene, 1,3-dimethylstyrene, alpha-methylstyrene, beta-methylstyrene, p-isopropylstyrene, 2,3-dimethylstyrene, o-chlorostyrene, p-chlorostyrene, o-bromostyrene, 2-chloro-4-methylstyrene, etc. The preferred vinyl aromatic hydrocarbon is styrene.

Many of the above-described copolymers of conjugated dienes and vinyl aromatic compounds are commercially available. The number average molecular weight of the block copolymers, prior to hydrogenation, is from about 20,000 to about 500,000, preferably from about 40,000 to about 300,000.

The average molecular weights of the individual blocks within the copolymers may vary within certain limits. In most instances, the vinyl aromatic block will have a number average molecular weight in the order of about 2000 to about 125,000, and in one embodiment between about 4000 and about 60,000. The conjugated diene blocks either before or after hydrogenation will have number average molecular weights in the order of about 10,000 to about 450,000 and in one embodiment from about 35,000 to about 150,000.

Prior to hydrogenation, the vinyl content of the conjugated diene portion generally in one embodiment is from about 10% to about 80%, and in one embodiment the vinyl content is from about 25% to about 65%, and in another embodiment from about 35% to about 55% when it is desired that the modified block copolymer exhibit rubbery elasticity. The vinyl content of the block copolymer can be measured by means of nuclear magnetic resonance.

Specific examples of diblock copolymers include styrene butadiene (SB), styrene-isoprene (SI), and the hydrogenated derivatives thereof. Examples of triblock polymers include styrene-butadiene-styrene (SBS), styrene-isoprene-styrene (SIS), alpha-methylstyrene-butadiene-alpha-methylstyrene, and alpha-methylstyrene-isoprene alpha-methylstyrene. Examples of commercially available block copolymers useful as the adhesives include those available from Shell Chemical Company under the tradename Kraton polymers and specific examples include D1101, D1107P, D1111, D1112P, D1113P, D1117P, and D1320X. Vector4111 is a SIS block copolymer available from Dexco of Houston, Tex.

Upon hydrogenation of the SBS copolymers comprising a rubbery segment of a mixture of 1,4 and 1,2 isomers, a styrene-ethylene-butylene styrene (SEBS) block copolymer is obtained. Similarly, hydrogenation of an SIS polymer yields a styrene-ethylene propylene-styrene (SEPS) block copolymer. The polymer and procedures for their preparation are described in U.S. Pat. Nos. 3,113,986 and 4,226,952, the disclosures of which are incorporated herein by reference.

A number of selectively hydrogenated block copolymers are available commercially from Shell Chemical Company under the general trade designation "Kraton®G." One example is Kraton G1652 which is a hydrogenated SBS triblock comprising about 30% by weight of styrene end blocks and a midblock which is a copolymer of ethylene and 1-butene (EB). A lower molecular weight version of G1652 is available from Shell under the designation Kraton G1650. Kraton G1651 is another SEBS block copolymer which contains about 33% by weight of styrene. Kraton G1657 is an SEBS diblock copolymer which contains about 13% wt styrene. This styrene content is lower than the styrene content in Kraton G1650 and Kraton G1652.

The block copolymers may also include functionalized polymers such as may be obtained by reacting an alpha, beta-olefinically unsaturated monocarboxylic or dicarboxylic acid reagent onto selectively hydrogenated block copolymers of vinyl aromatic hydrocarbons and conjugated dienes as described above. The reaction between the carboxylic acid reagent in the graft block copolymer can be effected in solutions or by a melt process in the presence of a free radical initiator.

The preparation of various selectively hydrogenated block copolymers of conjugated dienes and vinyl aromatic hydrocarbons which have been grafted with a carboxylic acid reagent is described in a number of patents including U.S. Pat. Nos. 4,578,429; 4,657,970; and 4,795,782, and the disclosures of these patents relating to grafted selectively hydrogenated block copolymers of conjugated dienes and vinyl aromatic compounds, and the preparation of such compounds are hereby incorporated by reference. U.S. Pat. No. 4,795,782 describes and gives examples of the preparation of the grafted block copolymers by the solution process and the melt process. U.S. Pat. No. 4,578,429 contains an example of grafting of Kraton G1652 (SEBS) polymer with maleic anhydride with 2,5-dimethyl-2,5-di(t-butylperoxy) hexane by a melt reaction in a twin screw extruder. (See Col. 8, lines 40–61.)

Examples of commercially available maleated selectively hydrogenated copolymers of styrene and butadiene include Kraton FG1901X, FG1921X, and FG1924X from Shell, often referred to as maleated selectively hydrogenated SEBS copolymers. FG1901X contains about 1.7% wt bound functionality as succinic anhydride and about 28% wt of styrene. FG1921X contains about 1% wt of bound functionality as succinic anhydride and 29% wt of styrene. FG1924X contains about 13% styrene and about 1% bound functionality as succinic anhydride.

Useful block copolymers also are available from Nippon Zeon Co., 2-1, Marunochi, Chiyoda-ku, Tokyo, Japan. For example, Quintac 3530 is available from Nippon Zeon and is believed to be a linear styrene-isoprene-styrene block copolymer.

Emulsion and solvent-based acrylic based PSAs are known and described in, for example, U.S. Pat. Nos. 5,639,811 and 5,164,444, respectively, and these patents are hereby incorporated by reference for such disclosures. When emulsions of the film materials and/or adhesive compositions are used, the water may be removed in an extruder by using the process described and claimed in U.S. Pat. 5,716,669 (LaRose et al).

In addition, the adhesive compositions may also contain at least one solid tackifier resin component. A solid tackifier is defined herein as one having a softening point above 80° C. When the solid tackifier resin component is present, the adhesive compositions generally comprise from about 40% to about 80% by weight of a thermoplastic elastomer component and from about 20% to about 60% by weight (or from about 55% to about 65% by weight) of a solid tackifier resin component. Conventional solid tackifier resins include hydrocarbon resins, rosin, hydrogenated rosin, rosin esters, polyterpene resins, and other resins which exhibit the proper balance of properties. A variety of useful solid tackifier resins are available commercially such as terpene resins which are sold under the trademark Zonatac by Arizona Chemical Company, and petroleum hydrocarbons resins such as the resins sold under the trademark Escorez by Exxon Chemical Company. Examples of a useful solid tackifier include Escorez 2596, Escorez 1310LC, and Wingtack 95 is a synthetic tackifier resin available from Goodyear, Akron, Ohio.

The adhesive compositions may also contain a liquid rubber, Liquid rubber are those rubbers which are liquid at room temperature. The liquid rubbers generally will have a Mw of at least 5,000 and more often at least 20,000. Incorporation of liquid rubbers in amounts of less than about 10%, and even less than about 5% by weight, based on the overall weight of the adhesive formulation, results in adhesives which is coextrudable with the polymeric core materials. Liquid block copolymers such as liquid styrene-isoprene block copolymers are particularly useful. Examples of commercially available rubbers include Kraton LVSI-101, available from the Shell Chemical Company, and Isolene D-400 from Elementis Performance Polymers, Belleville, N.J.

The adhesive compositions also may include other materials such as antioxidants, heat and light stabilizers, ultraviolet light absorbers, fillers, colorants, antiblocking agents, reinforcing agents, processing acids, etc. Hindered phenolic and amine antioxidant compounds may be included in the adhesive compositions, and a wide variety of such antioxidant compounds are known in the art. A variety of antioxidants are available from Ciba-Geigy under the general trade designations "Irganox" and "Irgafos". For example, the hindered phenolic antioxidant n-octadecyl 3-(3,5-di-t-butyl-4-hydroxyphenol)-proprionate is available under the general trade designation "Irganox 1076". Irganox 1010, is identified as Tetrakis (methylene 3-(3N,5N-di-tert-butyl-4N-hydroxyphenol) proprionate) methane. Irgafos 168 is another useful antioxidant from Ciba-Geigy. Hydroquinone-based antioxidants also may be utilized, and one example of such an antioxidant is 2,5-di-tertiary-amyl-hydroquinone.

Light stabilizers, heat stabilizers, and UV absorbers also may be included in the adhesive compositions. Ultraviolet absorbers include benzotriazole derivatives, hydroxy benzyl phenones, esters of benzoic acids, oxalic acid, diamides, etc. Light stabilizers include hindered amine light stabilizers, and the heat stabilizers include dithiocarbamate compositions such as zinc dibutyl dithiocarbamate.

The adhesive compositions, like the polymeric cores, may contain inorganic fillers and other organic and inorganic additives to provide desired properties. The additives are described above. Examples of useful fillers include calcium carbonate, titanium dioxide, metal particles, fibers, etc. An example of a reinforcing agent is Cumar LX509 from Neville.

As is described herein, the metallized layer may cover a portion or portions of the polymeric core. The metallized layer may also fully cover the polymeric core. The amount of coverage is determined by the use to made of the print qualities of the present invention.

Figure 5:
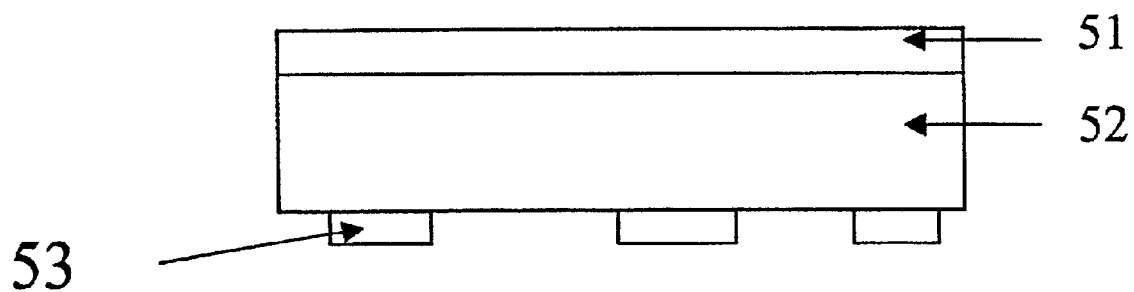
FIG. 5 is a cross section of an inkjet printable substrate having a inkjet coating, a polymeric core, and a metallized layer which only covers portions of the surface of the polymeric core.

FIG. 5 illustrates the situation where a portion of the polymeric core 52 is covered by the metallized layer 53. The metallic print qualities would only be present in the portions of the polymer core with the metallized layer. Inkjet coating 51 likewise could cover only portions of the polymeric core 52, but normally would completely cover the core.

Figure 6:
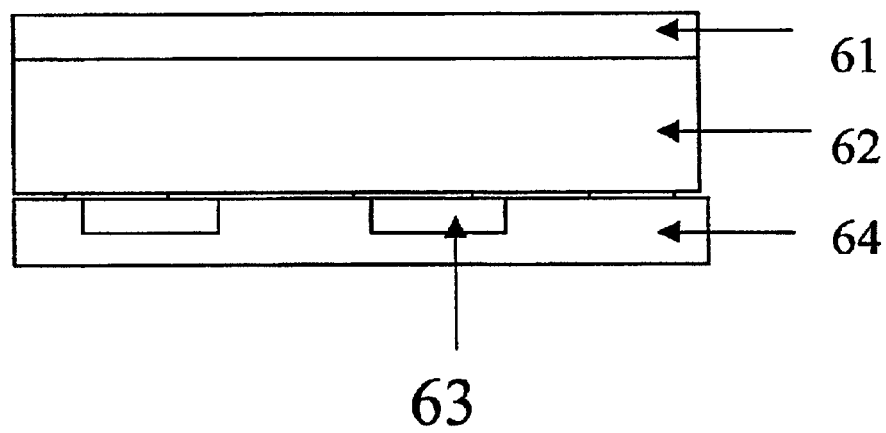
FIG. 6 is a cross section of an inkjet printable substrate having a inkjet coating, a polymeric core, a metallized layer, covering only a portion of the surface of the polymeric core, and an adhesive layer.

FIG. 6 illustrates the inkjet substrate having a polymeric core 62 with an inkjet coating 61 and metallized layer 63 (covering only a portion of the polymeric core 62). In this situation adhesive layer 64 is in contact with both the polymeric core 62 and with portions of the metallized layer 63.

The present inkjet substrates may be laminated onto card stock for greeting cards and index cards. The inkjet substrate may also be laminated to a label substrate to make printable labels. The inkjet substrate may be laminated to paperstock to form a printable media.

While the invention has been explained in relation to its preferred embodiments, it is to be understood that various modifications thereof will become apparent to those skilled in the art upon reading the specification. Therefore, it is to be understood that the invention disclosed herein is intended to cover such modifications as fall within the scope of the appended claims.

What is claimed is:

1. An inkjet substrate comprising a core having a first and second surface, an inkjet coating on the first surface; a metallized layer covering at least a portion of the second surface, and a primer layer between the first surface of the core and the inkjet coating.

2. The substrate of claim 1 wherein the core is paper.

3. The substrate of claim 1 wherein the core is polymeric.

4. The substrate of claim 3 wherein the polymeric core is a polyolefin, thermoplastic polymers of ethylene and propylene, a polyester, a polycarbonate, a polystyrene, a polyurethane, a polyacryl, a polymethacryl, a polyvinyl alcohol, a polyamide, a poly(ethylene vinyl alcohol), a vinyl acetate homopolymer, co- or terpolymer, an ionomer, and mixtures thereof.

5. The substrate of claim 3 wherein the polymeric core is a polyolefin, a polyester, a polyimide, a polyacrylate, a styrene polymer, or mixtures thereof.

6. The substrate of claim 3 wherein the polymeric core is a polyester.

7. The substrate of claim 1 wherein the core has a thickness from about 0.1 to about 10 mils.

8. The substrate of claim 1 wherein the metallized layer completely covers the second surface.

9. The substrate of claim 1 wherein the primer layer improves adhesion between the first surface of the core and the inkjet coating.

10. The substrate of claim 1 further comprising an adhesive layer on the surface of the metallized layer opposite the core.

11. The substrate of claim 10 wherein the adhesive is a pressure sensitive adhesive.

12. The substrate of claim 10 wherein the adhesive is a hot melt adhesive.

13. The substrate of claim 1 further comprising a second polymeric layer on the surface of the adhesive opposite the metallized layer.

14. An inkjet substrate comprising a polymeric core comprising a polyolefin, a polyester or a mixture thereof and having a first and second surface, an inkjet coating on the first layer; a metallized layer on the second surface; and and primer layer between the first surface of the polymeric core layer and the inkjet coating.

15. The substrate of claim 14 wherein the polymeric core is a polyester.

16. The substrate of claim 14 wherein the polymeric core has a thickness from about 0.3 to about 5 mils.

17. The substrate of claim 14 wherein the primer layer improves adhesion between the first surface of the polymeric core layer and the inkjet coating.

18. The substrate of claim 14 further comprising an adhesive layer on the surface of the metallized layer opposite the polymeric core layer.

19. The substrate of claim 18 wherein the adhesive is a pressure sensitive adhesive.

20. The substrate of claim 18 wherein the edhesive is a hot melt adhesive.

21. The substrate of claim 18 further comprising a second polymeric layer on the surface of the adhesive opposite the metalllzed layer.

22. An article comprising a support substrate adhered to the inkjet substrate of claim 1.

23. The article of claim 22 wherein the support substrate is a paper, card stock, metal, wood or plastic.

24. An article comprising a support substrate adhered to the inkjet substrate of claim 14.

25. The article of claim 24 wherein the support substrate is a paper, card stock, metal, wood or plastic.

26. An inkjet substrate comprising a core having a first and second surface, an inkjet coating on the first surface; and a metallized layer covering at least a portion of the second surface, wherein the inkjet coating comprises a chromium complex.

27. The substrate of claim 28, wherein the inkjet coating further comprises PVP.

28. The substrate of claim 26, wherein the inkjet coating further comprises silica gel.

29. An inkjet substrate comprising a polymeric core comprising a polyolefin, a polyester or a mixture thereof and having a first and second surface, an inkjet coating on the first layer; and a metallized layer on the second surface, wherein the inkjet coating comprises a chromium complex.

30. The substrate of claim 29, wherein the inkjet coating further comprises PVP.

31. The substrate of claim 29, wherein the inkjet coating further comprises silica gel.

* * * * *

UNITED STATES PATENT AND TRADEMARK OFFICE
CERTIFICATE OF CORRECTION

PATENT NO. : 6,783,816 B2
DATED : August 31, 2004
INVENTOR(S) : Golub et al.

It is certified that error appears in the above-identified patent and that said Letters Patent is hereby corrected as shown below:

Column 18,
Line 46, replace "and and" with -- and --.
Line 56, replace "edhesive" with -- adhesive --.
Line 65, replace "metalllzed" with -- metallized --.

Column 19,
Line 13, replace "claim 28" with -- claim 26 --.

Signed and Sealed this

Fifth Day of April, 2005

JON W. DUDAS
*Director of the United States Patent and Trademark Office*